(12) United States Patent
Bhalerao

(10) Patent No.: US 7,840,945 B2
(45) Date of Patent: Nov. 23, 2010

(54) SOFTWARE RESOURCE TESTING

(75) Inventor: Sandeep Satish Bhalerao, Pune Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/325,922

(22) Filed: Jan. 5, 2006

(65) Prior Publication Data

US 2007/0157175 A1 Jul. 5, 2007

(51) Int. Cl.
G06F 9/44 (2006.01)

(52) U.S. Cl. ................ 717/124; 717/125; 717/126; 717/127

(58) Field of Classification Search ......... 717/124, 717/125, 126, 127
See application file for complete search history.

(56) References Cited

U.S. PATENT DOCUMENTS

| | | | |
|---|---|---|---|
| 4,696,003 A | 9/1987 | Kerr et al. | |
| 5,490,249 A | 2/1996 | Miller | |
| 5,673,387 A | 9/1997 | Chen et al. | |
| 5,907,709 A | 5/1999 | Cantey et al. | |
| 6,397,353 B1 | 5/2002 | Orlidge et al. | |
| 6,725,399 B1 | 4/2004 | Bowman | |
| 6,772,411 B2 * | 8/2004 | Hayes et al. | 717/127 |
| 6,804,796 B2 | 10/2004 | Gustavsson et al. | |
| 6,826,716 B2 | 11/2004 | Mason | |
| 6,889,158 B2 * | 5/2005 | Penov et al. | 717/125 |
| 7,216,273 B2 * | 5/2007 | Phelps et al. | 714/724 |

FOREIGN PATENT DOCUMENTS

| | | |
|---|---|---|
| EP | 1094391 A1 | 4/2001 |
| JP | 2001243089 A | 9/2001 |

OTHER PUBLICATIONS

Gargantini, et al. "Using Model Checking to Generate Tests from Requirements Specifications" 1999, ACM, p. 146-162.*

* cited by examiner

Primary Examiner—Wei Y Zhen
Assistant Examiner—Qamrun Nahar
(74) Attorney, Agent, or Firm—Schmeiser, Olsen & Watts; William H. Steinberg

(57) ABSTRACT

A software resource testing system and method. A computing system comprising a software application receives data identifying an expected state for an external resource required for execution of the software application. The computing system receives data identifying a first action to be taken if the expected state does not equal an actual state generated during a functionality test for the identified external resource. The computing system receives data identifying a second action to be taken if the expected state equals the actual state during the functionality test. A resource listing test file comprising a list including the data identifying the external resource, the data identifying the expected state, the data identifying the first action, and the data identifying the second action is generated. The resource listing test file in stored in a memory system in a specified format.

31 Claims, 4 Drawing Sheets

SOFTWARE RESOURCE TESTING

BACKGROUND OF THE INVENTION

1. Technical Field

The present invention relates to a system and associated method for testing external resources necessary for execution of a software application.

2. Related Art

A system is typically dependent on resource systems for providing information so that the system is enabled to perform intended functions. Periodically, the resource systems do not function correctly thereby causing the system to malfunction. Therefore there exists a need for maintaining resource systems.

SUMMARY OF THE INVENTION

The present invention provides a providing a computing system comprising a memory system, said memory system comprising a software application and a testing tool suite, said testing tool suite comprising a comparing tool and an action tool;

receiving, by said computing system, data identifying at least one external resource required for execution of said software application;

receiving, by said computing system, data identifying an expected state for said at least one external resource, said expected state required for enabling said at least one external resource to perform a function for said execution of said software application;

receiving, by said computing system, data identifying a first action to be taken if said expected state does not equal an actual state generated during a functionality test for said at least one external resource to be performed by said testing tool suite;

receiving, by said computing system, data identifying a second action to be taken if said expected state equals said actual state during said functionality test;

generating a resource listing test file comprising a list including said data identifying said at least one external resource, said data identifying said expected state, said data identifying said first action, and said data identifying said second action;

storing said resource listing test file in said memory system, said resource listing test file stored in a specified format.

The present invention provides a computing system comprising a processor coupled to a computer-readable memory unit, said memory unit comprising a software application said a testing tool suite that when executed by the processor implements a software resource testing method, said method comprising:

receiving, by said computing system, data identifying at least one external resource required for execution of said software application;

receiving, by said computing system, data identifying an expected state for said at least one external resource, said expected state required for enabling said at least one external resource to perform a function for said execution of said software application;

receiving, by said computing system, data identifying a first action to be taken if said expected state does not equal an actual state generated during a functionality test for said at least one external resource to be performed by said testing tool suite;

receiving, by said computing system, data identifying a second action to be taken if said expected state equals said actual state during said functionality test;

generating a resource listing test file comprising a list including said data identifying said at least one external resource, said data identifying said expected state, said data identifying said first action, and said data identifying said second action;

storing said resource listing test file in said memory system, said resource listing test file stored in a specified format.

The present invention provides a computer program product, comprising a computer usable medium comprising a software application and computer readable code comprising a testing tool suite adapted to implement a software resource testing method within a computing system, said method comprising:

receiving, by said computing system, data identifying at least one external resource required for execution of said software application;

receiving, by said computing system, data identifying an expected state for said at least one external resource, said expected state required for enabling said at least one external resource to perform a function for said execution of said software application;

receiving, by said computing system, data identifying a first action to be taken if said expected state does not equal an actual state generated during a functionality test for said at least one external resource to be performed by said testing tool suite;

receiving, by said computing system, data identifying a second action to be taken if said expected state equals said actual state during said functionality test;

generating a resource listing test file comprising a list including said data identifying said at least one external resource, said data identifying said expected state, said data identifying said first action, and said data identifying said second action;

storing said resource listing test file in said memory system, said resource listing test file stored in a specified format.

The present invention provides a process for integrating computing infrastructure, comprising integrating computer-readable code into a computing system, wherein said computing system comprises a computer-readable memory unit, wherein said computer-readable memory unit comprises a software application and said computer-readable code, and wherein the code in combination with the computing system is capable of performing a software resource testing method, said method comprising:

receiving, by said computing system, data identifying at least one external resource required for execution of said software application;

receiving, by said computing system, data identifying an expected state for said at least one external resource, said expected state required for enabling said at least one external resource to perform a function for said execution of said software application;

receiving, by said computing system, data identifying a first action to be taken if said expected state does not equal an actual state generated during a functionality test for said at least one external resource to be performed by said testing tool suite;

receiving, by said computing system, data identifying a second action to be taken if said expected state equals said actual state during said functionality test;

generating a resource listing test file comprising a list including said data identifying said at least one external resource, said data identifying said expected state, said data identifying said first action, and said data identifying said second action;

storing said resource listing test file in said memory system, said resource listing test file stored in a specified format.

The present invention advantageously provides a system and associated method for maintaining resource systems.

DETAILED DESCRIPTION OF THE INVENTION

Figure 1:
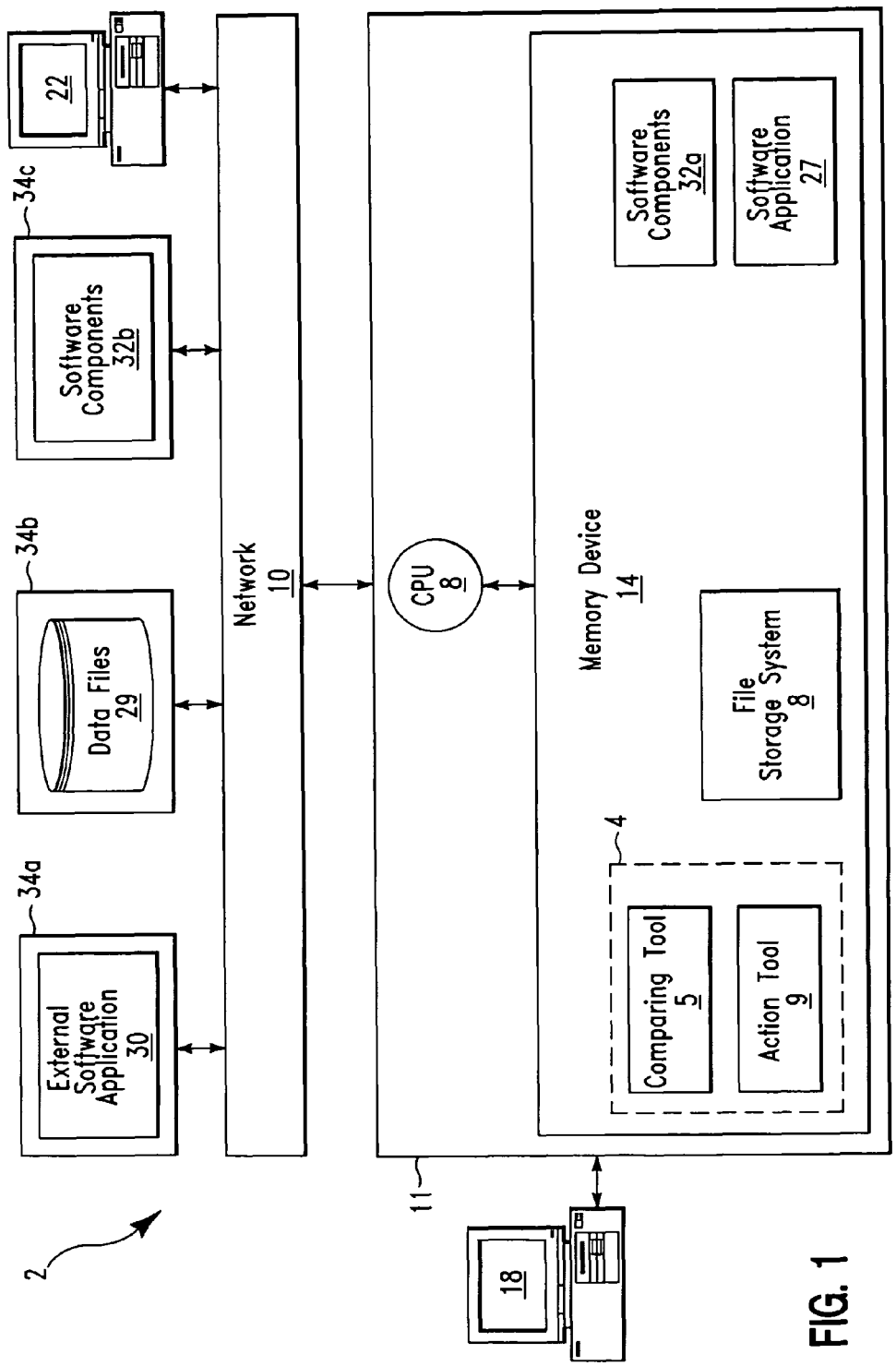
FIG. 1 illustrates a block diagram view of a system for testing external resources necessary for executing a software application, in accordance with embodiments of the present invention.

FIG. 1 illustrates a block diagram view of a system 2 for testing (i.e., for functionality) external resources necessary for executing a software application 27, in accordance with embodiments of the present invention. An external resource is defined herein as an external component (software or hardware) used by a software application (e.g., software application 27 in FIG. 1) to enable the software application to perform its intended function(s). A software application is defined herein as a fully functional software product used to perform a plurality of functions. For example, a software application may comprise, inter alia, operating system software, a word processing program, a spreadsheet program, etc. An external resource(s) is required for successful execution of the software application. An external resource is external to (i.e., separate from) the software application. External resources may be located on a same computer as the software application. Alternatively, external resources may be located in different geographical locations from the software application. An external resource may comprise software components such as, inter alia, additional software applications, software components or modules, database software, data files, etc. Alternatively, an external resource may comprise hardware components such as, inter alia, a network connected to a computing device comprising the software application, any hardware devices comprising software type of external resources connected to a computing device comprising the software application, etc. External resources required for execution of the software application must be available in an expected state or comprising an expected status (e.g., running, accessible, non-corrupted, authenticated, comprising a correct version, etc) for proper execution of the software application. External resources found to be in an unexpected (i.e., by the software application) state or status (herein referred to as state) may cause unexpected behavior during execution of the software application thereby causing a malfunction of the software application. Therefore, the present invention provides a testing procedure for testing external resources (and expected states for the external resources) to determine or identify errors (related to the external resources) and generate corrective actions (e.g., report to an error to a user, enable an expected state for the external resource, etc.) so that the software application may function properly. The testing procedure may be performed during a testing phase of the software application (i.e., prior to execution of the software application). Alternatively, the testing procedure may be performed during a runtime (i.e., in real time) of the software application when execution of the software application fails.

The system 2 of FIG. 1 comprises a computing system 11 connected to computing systems 34a . . . 34c through a network 10 and administrator terminals 18 and 22. Network 10 may comprise any type of network known to a person of ordinary skill in the art including, inter alia, a local area network, (LAN), a wide area network (WAN), the Internet, etc. Administrator terminals 18 and 22 may comprise any type of computing apparatus including, inter alia, a personal computer (PC), a laptop computer, a personal digital assistant (PDA), etc. Computing system 11 comprises a central processing unit (CPU) connected to a memory device 14. The memory device 14 comprises a software application 27, a testing tool suite 4 (i.e., external resource testing software), software components 32a, and a file storage system 8 comprising resource listing test files. The file storage system 8 may comprise any type of computer file storage system known to a person of ordinary skill in the art including, inter alia, a word processing file storage system, a presentation file storage system, a database file storage system, etc. Additionally, the file storage system 8 may comprise computer files in a database file storage system. The testing tool suite 4 comprises a comparing tool 5 and an action tool 9. Software components 32a include a library of software modules or sub-routines used by the software application 27. Each software module of the software components 32a is an external resource (i.e., software) for the software application 27. Computing system 34a comprises an external software application 30. The computing system 34a is an external resource (i.e., hardware) for the software application 27. The external software application 30 is an external resource (i.e., software) for the software application 27. The external software application 30 may comprise any type of software application required for execution of the software application 27. Computing system 34b comprises data files 29. The computing system 34b is an external resource (i.e., hardware) for the software application 27. The data files 29 are an external resource (i.e., software) of the software application 27. For example, if the software application 27 is a word processing program, then the data files 29 may comprise word processing files. Computing system 34c comprises software components 32b. The computing system 34c is an external resource (i.e., hardware) for the software application 27. Software components 32b include a library of software modules or routines used by the software application 27. Each software module of the software components 32b is an external resource (i.e., software) for the software application 27. The network 10 is an external resource (i.e., hardware) of the software application 27. Each of the aforementioned external resources must be available (i.e., in a required state) at various times for successful execution of the software application 27. The testing procedure comprises two phases. The first phase comprises generating a test plan and software (i.e., testing tool suite 4 comprising comparing tool 5 and action tool 9) for implementing specified tests for testing a state for each of the external resources and as a result of testing, actions are implemented. The second phase comprises implementing the test plan generated in phase 1.

Phase One

In phase one, a testing procedure/software (e.g., testing tool suite 4) will be generated to test each external resource for a required state(s). Additionally, the testing procedure/software may execute actions if an external resource is not found to comprise a required state. In order to generate the testing procedure, a list comprising all external resources required for successful execution of the software application 27 is generated. In FIG. 1, each of computing systems 34*a* . . . 34*c*, network 10, software components 32*a*, software components 32*b*, data files 29, and external software application 30 are determined to be external resources, therefore a list comprising the aforementioned external resources is generated. Each of the external resources is required to be available to the software application 27 in a required state for successful execution of the software application 27. During testing, an actual state for each of the external resources may not comprise a required state which may in turn cause the software application 27 to malfunction. Therefore, each external resource must be tested for the required state. For example, the network 10 must be running in order for the software application 27 to be able to communicate with the computing systems 34*a* . . . 34*c*. Therefore, the required state for the network 10 may comprise "up and running". During testing it may be determined that an actual (incorrect) state for the network 10 comprises "down" (i.e., the network 10 is not running). Additionally, each of the computing systems 34*a* . . . 34*c* must be up and running (i.e., powered up) in order for the software application 27 to retrieve information from the computing systems 34*a* . . . 34*c*. Therefore, a required state for each of the computing systems 34*a* . . . 34*c* may comprise "up and running". Additionally, each of the software application 30, data files 29, and software components 32*b* comprises at least one required state in order for the software application 27 to function properly. For example, the external software application 30 may require a first state of version A in order for the software application 27 to function properly. Therefore, the first required state for the external software application 30 is "version A". Additionally, the external software application 30 may comprise a second required state "not corrupted". Note that in order for each of the software application 30, data files 29, and software components 32*b* to be tested (i.e., for a required state), each of the computing systems 34*a* . . . 34*c* must be tested first because each of the software application 30, data files 29, and software components 32*b* will not function if each of the computing systems 34*a* . . . 34*c* are not functioning. An example of required states for each of the external resources in FIG. 1 is added to the list of external resources as illustrated by table 1.

TABLE 1

| External Resource | Required State |
|---|---|
| Software Components 32a | Available |
| Computing system 34a | Up and running |
| Computing system 34b | Up and running |
| Computing system 34c | Up and running |
| Network 10 | Up and running |
| External software application 30 | Version A |
| External software application 30 | Not corrupt |
| Data files | Not corrupt |
| Software Components 32b | Available |

In order to test each external resource for a required state, the system 2 must be enabled and an actual state for each external resource must be retrieved. Each actual state is compared to an associated required state from table one (i.e., by the comparing tool 5) and a specified action may be implemented (i.e., by the action tool 9) based on results of the comparison. For example, if the network 10 is to be tested, the testing tool suite (via the computing system 11) is connected to the network 10 to retrieve an actual state of the network 10. If the network 10 is found to comprise an actual state of "down" which is not a same state as a specified required state (i.e., Up and running) from table 1, a corrective action (e.g., "Enable network connection" from table 2, supra) must be taken so that the required state for the network 10 is achieved (i.e., "up and running") otherwise the software application 27 will malfunction. Therefore, actions must be specified and associated with each external resource so that if the actual state does not comprise a same state as the required state, the associated action will be implemented. Additionally, actions may be specified and associated with each external resource so that if the actual state does comprise a same state as the required state, an associated action will be implemented (e.g., notify a user that the required state has been met). An example of actions associated with the external resources (i.e., if the actual state does not comprise a same state as the required state) of table 1 is illustrated in table 2 below.

TABLE 2

| External Resource | Required State | Actual State | Action |
|---|---|---|---|
| Software Components 32a | Available | Unavailable | Notify user that subroutine A is unavailable |
| Computing system 34a | up and running | down | Restart Computing system 34a |
| Computing system 34b | up and running | down | Restart Computing system 34b |
| Computing system 34c | up and running | down | Restart Computing system 34c |
| Network 10 | Up and running | Down | Enable network connection |
| External software application 30 | Version A | Version B | Notify user that version A is unavailable. |
| External software application 30 | Not corrupt | Corrupt | Notify user of corrupt data |
| Data files | Not corrupt | Corrupt | Notify user of corrupt data |
| Software Components 32b | Available | Not available | Notify user that subroutine is unavailable |

Some of the actions in table 2 comprise corrective actions in response to a difference between an actual state and a required state. For example, the action "Enable network connection" in row 5, col. 4 of table 2 associated with the network 10 is implemented if the actual state does not equal the required state. The action "Enable network connection" comprises automatically enabling a network connection between the network 10 and the computing system 11 so that communications with the network 10 are enabled. Alternatively, some actions in table 2 comprise notifying a user of a problem in response to a difference between an actual state and a required state so that the user may manually correct a problem. For example, the action ("Notify user that subroutine is unavailable") in row 9, col. 4 of table 2 associated with the software components 32*b* comprises notifying a user that a required sub-routine is not available for the software application 27. In response, the user may retrieve the required sub-routine from another location (e.g., from another database)

and place it with the software components 32b thereby correcting the problem (i.e., making the subroutine available for the software application).

The testing procedure may be carried out manually by implementing the testing procedure/software (i.e., testing tool suite 4) and manually executing (i.e., by a user or administrator) actions specified in table 2 based on the results of a comparison between the required state verses an actual state. Alternatively, the testing procedure may be automated. For example, a software program (e.g., testing tool suite 4 comprising the action tool 9) may developed which would automatically enable the system 2 and implement the following activities with respect to each external resource:

1. Locate the external resource.

2. Retrieve data (i.e., an actual state) regarding the external resource.

3. Compare required state verses actual state.

4. Automatically implement associated actions.

In order to test each external resource for a required state, attributes and values for attributes (i.e., information) related to each external resource (e.g., required states, actions to be performed, information used to identify and connect to each external resource, etc) are gathered and entered into the computing system 11. An attribute is defined herein as an identifier for a characteristic or property (i.e., a value) of an external resource. The attributes and values are entered into the computing system 11 through administrator terminal 18 and/or 22. The attributes and values (i.e., for each external resource) are stored as individual external resource files in the file storage system 8. Table 3 illustrates a table comprising example attributes and values (e.g., required state, action to be performed, information used to identify and connect to an external resource, etc) related to computing system 34b (i.e., an external resource) used to setup a testing procedure to test for a required state for the computing system 34b. The computing system 34b is a database server.

TABLE 3

| Attribute | Example Value | Description of Attribute |
|---|---|---|
| RuntimeSoftwareResourcesList | | Attribute identifies external resource information. |
| Resource | | Attribute identifies a start for the external resource information |
| ResourceID | Computing system 34a | Value of attribute identifies the external resource. |
| ResourceType | Database server | Value of attribute identifies the type of external resource |
| TestStatus | Up and Running | Value of attribute identifies a required state for the external resource. |
| ResourceURL | jdbc:odbc:company | Value of attribute identifies a URL (Unified Resource Locator) used to access the external resource. |
| ConnectionURL | jdbc:odbc:company | Value of attribute identifies URL (Unified Resource Locator) used to connect to the external resource. |
| UserID | dbAdmin | Value of attribute provides a user id |
| Password | Adminpwd | Value of attribute provides a password to enable communications with the external resource. |
| ActionOnFailure | Restart Computing system 34a | Value of attribute identifies an action to be taken if the expected state does not equal an actual state. |

Table 3 is used to generate an external resource file for testing the computing system 34a and executing an action based on results of the test. The attributes and values from table 3 are stored in the file storage system 8 in the memory device 14 as an external resource file. The external resource file may be stored in any file format or any database table format known to a person of ordinary skill in the art. For example, external resource file may be stored as an Internet standard XML (Extensible Markup Language) format. An XML file format comprises an advantage over other computer file formats because an XML format may be read by users as well as computers (i.e., computers capable of reading XML file formats). An XML format comprises data (i.e., information related to an external resource) listed as user defined attributes known as XML tags with corresponding values. The "Resources.xml listing" file below illustrates an XML external resource file generated from table 3 and is used by the system 2 to connect to and test for a required state for the computing system 34A and executing an action based on results of the test.

Resources.xml Listing:

```
<?xml version="1.0"encoding="ISO-8859-1"?>
<RuntimeSoftwareResourcesList>
    <Resource>
        <ResourceID>Computing system 34A</ResourceID>
        <ResourceType>Databaseserver</ResourceType>
        <TestStatus>UpandRunning</TestStatus>
        <ResourceURL>jdbc:odbc:company </ResourceURL>
        <ConnectionURL>jdbc:odbc:company </ConnectionURL>
        <UserID>dbAdmin</UserID>
        <Password>adminpwd</Password>
        <ActionOnFailure>C:\Restart Computing system 34a</ActionOnFailure>
    </Resource>
</RuntimeSoftwareResourcesList>
```

The "Resources.xml listing" file comprises "RuntimeSoftwareResourcesList" as a first attribute that identifies all information in the "Resources.xml listing" file. The next attribute "Resource" identifies a start of the information related to the resource (i.e., computing system 34a). The attribute "ResourceID" identifies the computing system 34a. The attribute "ResourceType" identifies a type of external resource (i.e., Database server). The attribute "TestStatus" comprises an identifier for a required state for the computing system 34a (i.e., up and running). The attribute "ResourceURL", identifies a URL used to access the external resource (i.e., jdbc:odbc:company). The attribute "ConnectionURL" identifies a URL used to connect to the external resource (i.e., jdbc:odbc:company). The attribute "UserID" identifies a user (dbAdmin) that is authorized to access or to connect to the external resource. The attribute password identifies a password (adminpwd) used to authenticate a connection to the external resource using values of attributes "UserID" and "Password". The attribute is "ActionOnFailure" identifies an action (Restart Computing system 34a) which when executed will correct an error situation of the external resource if the actual state does not comprise "up and running". The external resource files store in the file storage system 8 are used for testing the external resources and implementing actions as described with respect to phase two.

Phase Two

In phase two the external resource test plan generated in phase 1 is implemented. The testing tool suite 4 is executed thereby initiating the testing process. The testing tool suite 4 comprises software tools (e.g., comparing tool 5, action tool 9, etc) for executing external resource testing (i.e., testing for a required state) and executing actions based on results of the testing. The testing process comprises:

1. Retrieving an external resource file for one of the external resources (e.g., the "Resources.xml listing" file) from file storage system 8.

2. Using the external resource file to determine the external resource to be tested.

3. Connecting to the external resource to be tested.

4. Enabling the external resource to be tested.

5. Retrieving an actual state/status of the external resource to be tested.

6. Comparing the actual state/status of the external resource to be tested to the required state/status of the external resource to be tested (i.e., from the external resource file).

7. Implementing an action based on results of the comparison.

This process is repeated for each of the external resources.

An example for implementation of the testing procedure for testing a state/status for external resources and implementing actions based on the test as described is described as follows:

Consider a library comprising a collection of books. The collection of books comprises many different types of books and many different authors. Additionally, there are many members or users of the library. In order to maintain information related to books and the members, the library uses a software application (e.g., software application 27) to maintain all of the information. The software application comprises the ability to add or update book records and member records. Additionally, the software application comprises the ability to search for a particular book based on a specified criteria (e.g. title of a book, author of a book, etc). The software application requires the use of two computing systems (i.e. external resources) in order to maintain all of the information. A first computing system is located at a librarian's desk and a second computing system is located in a restricted area. The first computing system comprises the software application and a third party software library (i.e., a $1^{st}$ external resource) used by the software application for some of its internal functionality. The second computing system (i.e., a $2^{nd}$ external resource) comprises a database system (i.e., a $3^{rd}$ external resource). The database system keeps data in a persistent manner. The first computing system is connected to the second computing system through a computer network (i.e., a $4^{th}$ external resource). In order to search for books and member information the software application requires the use of all of the external resources (i.e., the $1^{st}$ external resource, the $2^{nd}$ external resource, the $3^{rd}$ external resource, and the $4^{th}$ external resource). Therefore, each of the second computing system, the database system, the third party software application, and the network must be functioning properly for proper execution of the software application. For example, the second computing system must comprise a required state of "up and running", the network must comprise a required state "up and running", and the third party software library must comprise a required state of "Not corrupt".

A test procedure (e.g., the testing tool suite 4 and external resource files for each external resource) is generated to test each of the external resources for required states. The test procedure enables each external resource and retrieves a required state for each of the external resources and compares the actual state to the required state (i.e., from the external resource file). Based on the results of the comparison, an action is executed. The action either corrects an error situation (i.e., difference between an actual state and a required state) or logs the error (i.e. action on failure procedures).

During execution of the test procedure, the $1^{st}$ external resource (i.e. third party software library) is tested (i.e., by the testing tool suite) to determine if the actual state is the same as the required state (i.e., not corrupt). The test procedure determines that the actual state is the same as the required state (i.e., not corrupt) so therefore the $1^{st}$ external resource (i.e. third party software library) is determined to be functioning correctly. Since the second computing system (i.e., the $2^{nd}$ external resource) and the database system (i.e., a $3^{rd}$ external resource) are dependant on the computer network (i.e., the $4^{th}$ external resource), the computer network (i.e., the $4^{th}$ external resource) is tested next to determine if the actual state is the same as the required state (i.e., up and running). The test procedure determines that the actual state is the same as the required state (i.e., up and running) so therefore the computer network (i.e., the 4$^{th}$ external resource) is determined to be functioning correctly. Since the database system (i.e., the 3$^{rd}$ external resource) is dependant on the second computing system (i.e., the 2$^{nd}$ external resource), the second computing system (i.e., the 2$^{nd}$ external resource) is tested next to determine if the actual state is the same as the required state (i.e., running). The test procedure determines that the actual state is the same as the required state (i.e., running) so therefore the second computing system (i.e., the 2$^{nd}$ external resource) is determined to be functioning correctly. Finally, the database system (i.e., the 3$^{rd}$ external resource) is tested to determine if the actual state is the same as the required state (i.e., up). The test procedure determines that the actual state (down) is not the same as the required state (i.e., up) so therefore an error is detected for database system (i.e., the 3$^{rd}$ external resource). In response to the error, the testing procedure automatically executes an action (e.g., restart database system) from the external resource file for the database system to correct the error. The database system is restarted and the testing procedure is terminated.

Figure 2:
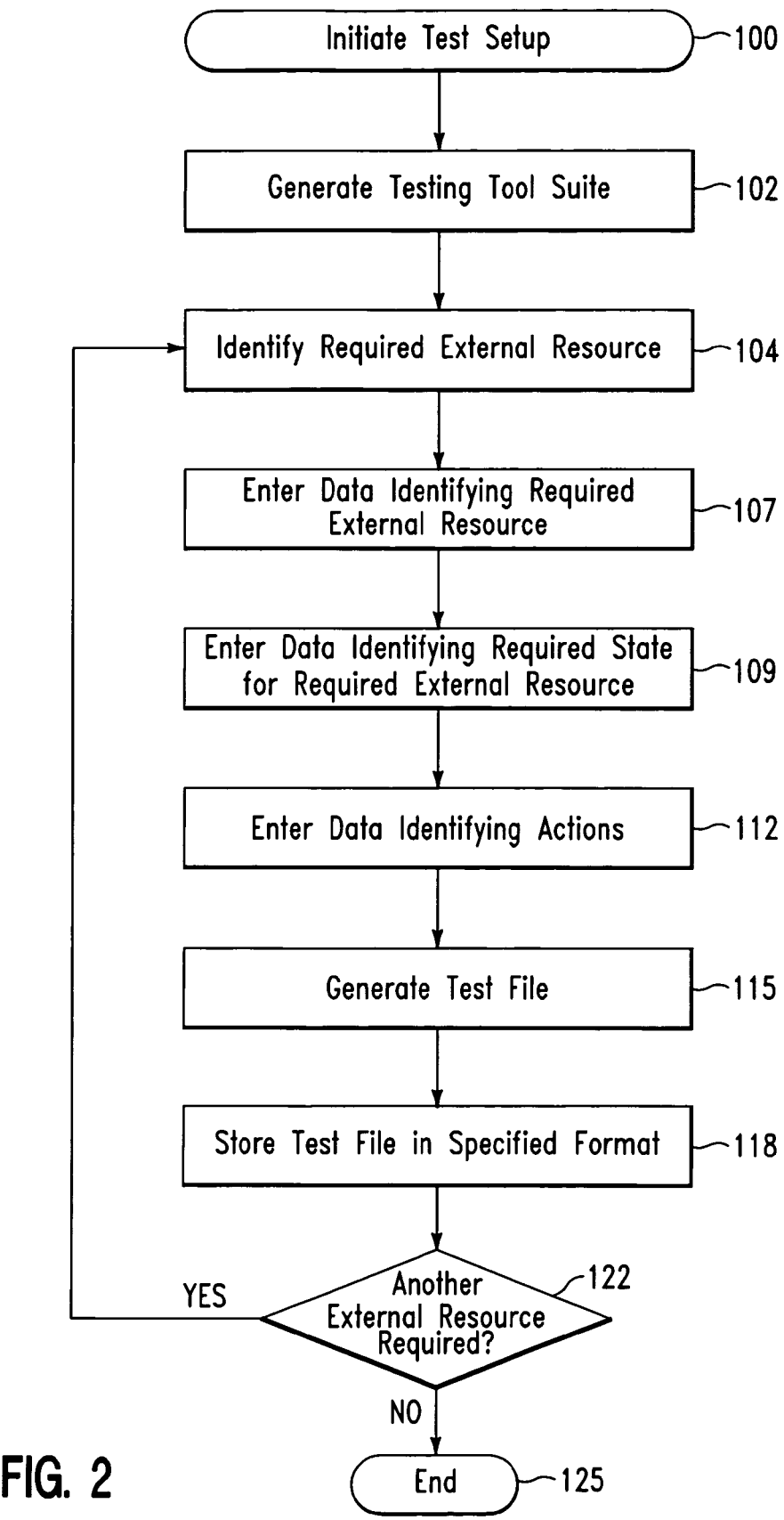
FIG. 2 is a flowchart illustrating an algorithm describing a process for generating a test plan and software for implementing a specified test for testing a state for each of the external resources of FIG. 1 and implementing actions, in accordance with embodiments of the present invention.

FIG. 2 is a flowchart illustrating an algorithm describing a process for generating a test plan and software for implementing a specified test for testing a state for each of the external resources of FIG. 1 (i.e., required for execution of software application 27) and implementing actions, in accordance with embodiments of the present invention. In step 100, a test setup phase is initiated. In step 102, the testing tool suite 4 is developed and generated. The testing tool suite 4 is used to retrieve external resource files for each external resource, perform a test for each external resource, and implement actions based on results of each test. In step 104, a required external resource is determined. In step 107, data identifying the external resource is entered into the computing system 11. The data may comprise, inter alia, attributes and values comprising external resource identification information (e.g., ResourceID, Computing system 34a) from table 3 as described with reference to FIG. 1, supra. In step 109, data identifying a required state for the external resource is entered into the computing system 11. The data may comprise, inter alia, attributes and values comprising external resource required state information (e.g., TestStatus, Up and Running) from table 3 as described with reference to FIG. 1, supra. In step 112, data identifying an associated action to be performed based on results of a comparison of an actual state for the external resource and the required state identified in step 109. The data may comprise, inter alia, attributes and values (e.g., ActionOnFailure, Restart Computing system 34a) from table 3 as described with reference to FIG. 1, supra. In step 115, a test file for storing the data from steps 107, 109, and 112 is generated. In step 118, the test file is stored in the file storage system 8 in a specified format. For example, the test file may be stored in an Internet standard XML (extended markup language) format (e.g., see the "Resources.xml listing" file described with reference to FIG. 1). In step 122, it is determined if another external resource is required for execution of software application 27. If in step 122, it is determined that another external resource is required for execution of software application 27, then step 104 is repeated. If in step 122, it is determined that another external resource is not required for execution of software application 27, then in step 125 the process is terminated.

Figure 3:
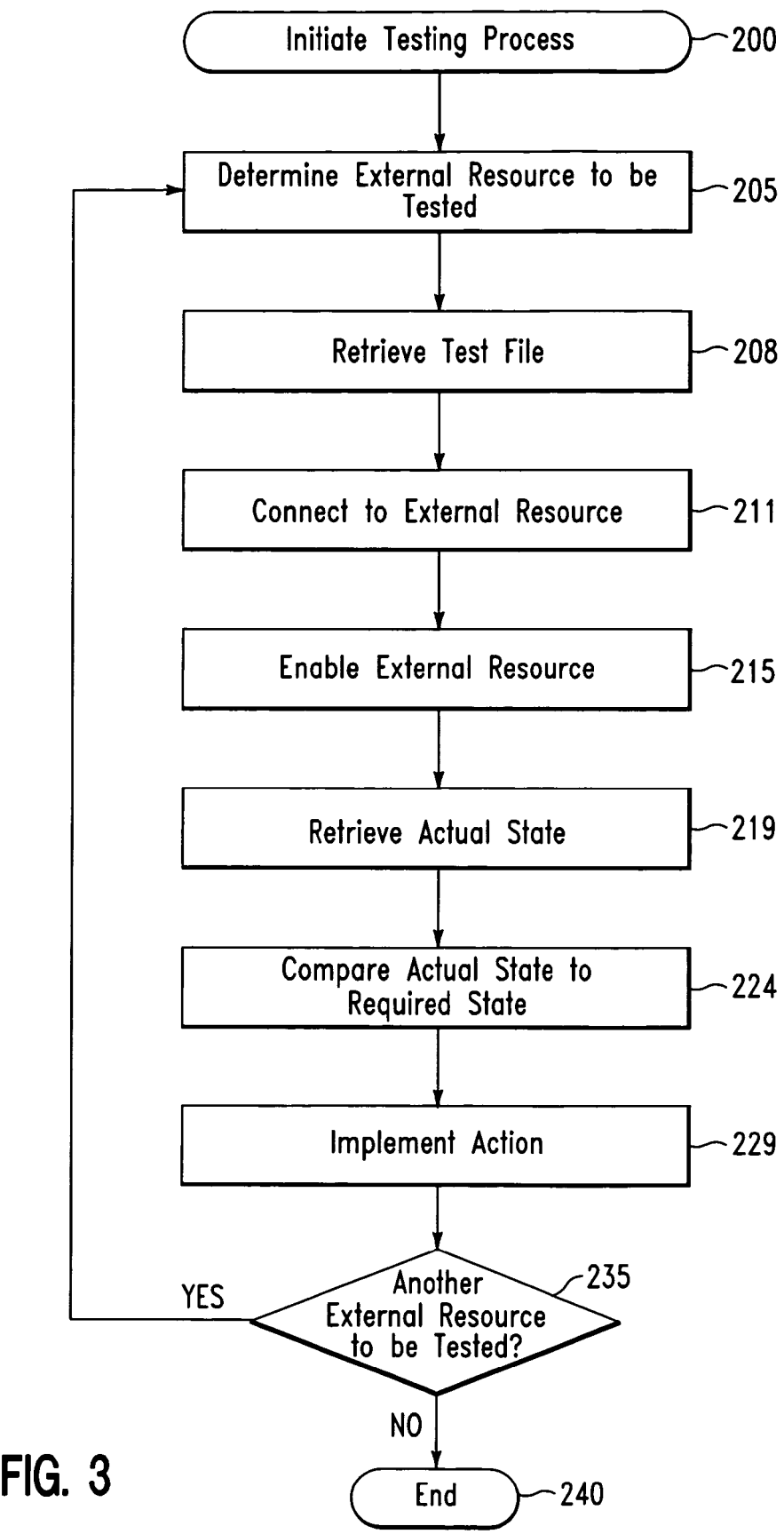
FIG. 3 is a flowchart illustrating an algorithm describing a process for implementing the test plan generated in the flowchart of FIG. 2, in accordance with embodiments of the present invention.

FIG. 3 is a flowchart illustrating an algorithm describing a process for implementing the test plan generated in the flowchart of FIG. 2, in accordance with embodiments of the present invention. In step 200, the computing system 2 is enabled and the testing process is initiated. In step 205, an external resource to be tested is determined. In step 208, a test file (i.e., stored in step 118 of FIG. 2) for the external resource to be tested is retrieved from the file storage system 8. In step 211, the testing tool suite 4 is connected (i.e., using information from the retrieved test file) to the external resource to be tested. In step 215, the external resource to be tested is enabled (i.e., using information from the retrieved test file). In step 219, an actual state for the external resource is retrieved. In step 224, the actual state is compared to the required state (i.e., specified in test file) to determine if they match. In step 229, an action is implemented based on results of the comparison from step 224. In step 235, it is determined if another external resource required for execution of software application 27 is to be tested. If in step 235, it is determined that another external resource required for execution of software application 27 is to be tested, then step 205 is repeated. If in step 235, it is determined there are no more external resources to be tested, then in step 240 the process is terminated.

Figure 4:
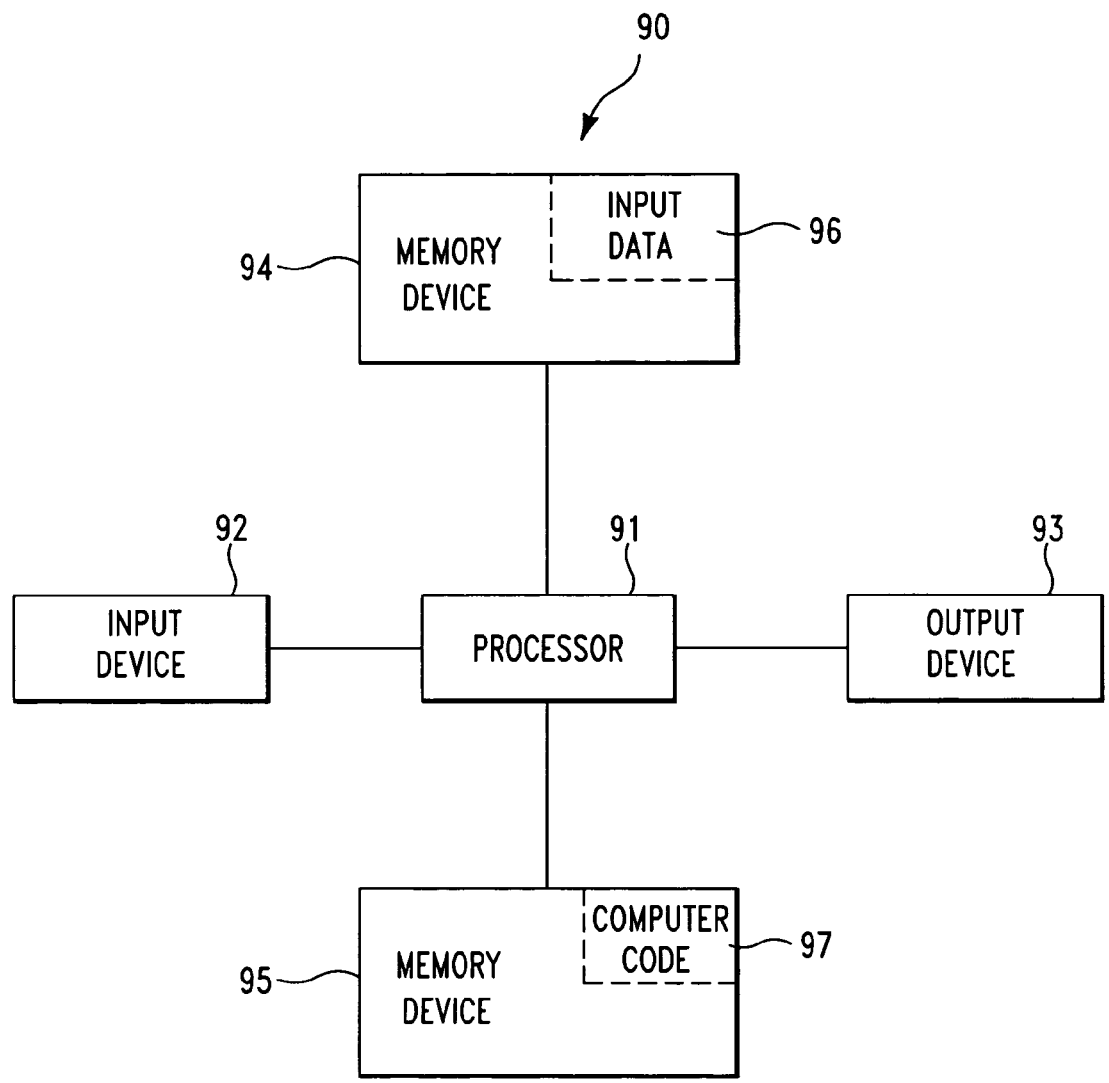
FIG. 4 illustrates a computer system comprised by the system of FIG. 1, in accordance with embodiments of the present invention.

FIG. 4 illustrates a computer system 90 (i.e., comprised by the computing system 11 of FIG. 1) for testing (i.e., for functionality) external resources necessary for executing software application 27, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used for testing external resources necessary for executing software application 27 of FIG. 1. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise any of the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for testing external resources necessary for executing software application 27 of FIG. 1.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software resource testing method, comprising:
providing a computing system comprising a memory system, said memory system comprising a software application and a testing tool suite, said software application independent from said testing tool suite, said testing tool suite comprising a comparing tool and an action tool;
providing, at least one external resource required for execution of said software application, said least one external resource independent from said software application and said testing tool suite;
receiving, by said computing system, a first table comprising data identifying said at least one external resource required for execution of said software application and data identifying an expected state for said at least one external resource, said expected state required for enabling said at least one external resource to perform a function for said execution of said software application;
receiving, by a computer processor of said computing system, data identifying a first action to be taken if said expected state does not equal an actual state generated during a functionality test for said at least one external resource to be performed by said testing tool suite;
receiving, by said computing system, data identifying a second action to be taken if said expected state equals said actual state during said functionality test;
receiving, by said computing system, a second table comprising data identifying an attribute and an associated value for said at least one external resource and a description for said attribute;
generating a resource listing test file comprising a list including said data identifying said at least one external resource, said data identifying said expected state, said data identifying said first action, said data identifying said second action, said attribute, and said associated value;
storing said resource listing test file in said memory system, said resource listing test file stored in a specified format;
retrieving, by said computing system, said resource listing test file from said memory system;
connecting said at least one external resource to said computing system;
enabling, by said computing system, said at least one external resource;
generating, by said at least one external resource, said actual state for said at least one external resource;
retrieving, by said computing system, data describing said actual state; and
comparing, by said comparing tool, said expected state from said resource listing test file to said actual state generated by said at least one external resource.

2. The method of claim 1, further comprising:
determining, by said comparing tool, that said expected state does not equal said actual state; and
executing, by said action tool, said first action.

3. The method of claim 2, wherein said executing said first action comprises reporting to a user that said expected state does not equal said actual state which indicates to said user a malfunction of said at least one external resource.

4. The method of claim 3, wherein said executing said first action further comprises repairing said malfunction.

5. The method of claim 4, wherein said executing said first action further comprises generating a log file, said log file indicating that said malfunction has been repaired.

6. The method of claim 1, further comprising:
determining, by said comparing tool, that said expected state equals said actual state; and
executing, by said action tool, said second action.

7. The method of claim 6, wherein said executing said second action comprises reporting to a user that said expected state equals said actual state which indicates to said user that said at least one external resource is functioning correctly.

8. The method of claim 7, wherein said executing said second action further comprises generating a log file, said log file indicating that said at least one external resource is functioning correctly.

9. The method of claim 1, wherein said specified format comprises an Extensible Markup Language (XML) format.

10. The method of claim 1, wherein said at least one external resource is selected from the group consisting of an external software application connected to said computing system, an external hardware device connected to said computing system, a network connected to said computing system, an external computer file connected to said computing system, and a library comprising software components connected to said computing system.

11. The method of claim 1, wherein said at least one external resource is an external hardware device.

12. The method of claim 1, wherein said first action comprises restarting said computing system.

13. A computing system comprising a computer processor coupled to a computer-readable memory device, said memory device comprising a software application said a testing tool suite that when executed by the processor implements a software resource testing method, said software application independent from said testing tool suite, said method comprising:
receiving, by said computing system, a first table comprising data identifying at least one external resource required for execution of said software application, said least one external resource independent from said software application and said testing tool suite;
receiving, by said computing system, data identifying an expected state for said at least one external resource and data identifying an expected state for said at least one external resource, said expected state required for enabling said at least one external resource to perform a function for said execution of said software application, said expected state required for enabling said at least one external resource to perform a function for said execution of said software application;
receiving, by a computer processor of said computing system, data identifying a first action to be taken if said expected state does not equal an actual state generated during a functionality test for said at least one external resource to be performed by said testing tool suite;
receiving, by said computing system, data identifying a second action to be taken if said expected state equals said actual state during said functionality test;
receiving, by said computing system, a second table comprising data identifying an attribute and an associated value for said at least one external resource and a description for said attribute;
generating a resource listing test file comprising a list including said data identifying said at least one external resource, said data identifying said expected state, said data identifying said first action, said data identifying said second action, said attribute, and said associated value;

storing said resource listing test file in said memory device, said resource listing test file stored in a specified format;

retrieving, by said computing system, said resource listing test file from said memory unit;

connecting said at least one external resource to said computing system;

enabling, by said computing system, said at least one external resource;

generating, by said at least one external resource, said actual state for said at least one external resource;

retrieving, by said computing system, data describing said actual state; and comparing, by said comparing tool, said expected state from said resource listing test file to said actual state generated by said at least one external resource.

14. The computing system of claim 13, wherein said method further comprises:

determining that said expected state does not equal said actual state; and executing said first action.

15. The computing system of claim 14, wherein said executing said first action comprises reporting to a user that said expected state does not equal said actual data value which indicates to said user a malfunction of said at least one external resource.

16. The computing system of claim 15, wherein said first action further comprises repairing said malfunction.

17. The computing system of claim 13, wherein said method further comprises:

determining that said expected state equals said actual state; and executing said second action.

18. The computing system of claim 17, wherein said executing said second action comprises reporting to a user that said expected state equals said actual state which indicates to said user that said at least one external resource is functioning correctly.

19. A computer program product, comprising a non transitory computer readable memory device comprising a software application and computer readable code comprising a testing tool suite adapted to implement a software resource testing method within a computing system, said software application independent from said testing tool suite, said method comprising:

receiving, by said computing system, a first table comprising data identifying at least one external resource required for execution of said software application, said least one external resource independent from said software application and said testing tool suite;

receiving, by said computing system, data identifying an expected state for said at least one external resource and data identifying an expected state for said at least one external resource, said expected state required for enabling said at least one external resource to perform a function for said execution of said software application, said expected state required for enabling said at least one external resource to perform a function for said execution of said software application;

receiving, by a computer processor of said computing system, data identifying a first action to be taken if said expected state does not equal an actual state generated during a functionality test for said at least one external resource to be performed by said testing tool suite;

receiving, by said computing system, data identifying a second action to be taken if said expected state equals said actual state during said functionality test; receiving, by said computing system, a second table comprising data identifying an attribute and an associated value for said at least one external resource and a description for said attribute;

generating a resource listing test file comprising a list including said data identifying said at least one external resource, said data identifying said expected state, said data identifying said first action, said data identifying said second action, said attribute, and said associated value;

storing said resource listing test file in a memory system, said resource listing test file stored in a specified format;

retrieving, by said computing system, said resource listing test file from said memory system;

connecting said at least one external resource to said computing system;

enabling, by said computing system, said at least one external resource;

generating, by said at least one external resource, said actual state for said at least one external resource;

retrieving, by said computing system, data describing said actual state; and comparing, by said comparing tool, said expected state from said resource listing test file to said actual state generated by said at least one external resource.

20. The computer program product of claim 19, wherein said method further comprises:

determining that said expected state does not equal said actual state; and executing said first action.

21. The computer program product of claim 20, wherein said executing said first action comprises reporting to a user that said expected state does not equal said actual state which indicates to said user a malfunction of said at least one external resource.

22. The computer program product of claim 21, wherein said first action further comprises repairing said malfunction.

23. The computer program product of claim 22, wherein said first action further comprises generating a log file, said log file indicating that said malfunction has been repaired.

24. The computer program product of claim 19, wherein said method further comprises:

determining that said expected state equals said actual state; and executing said second action.

25. The computer program product of claim 24, wherein said executing said second action comprises reporting to a user that said expected state equals said actual state which indicates to said user that said at least one external resource is functioning correctly.

26. The computer program product of claim 25, wherein said second action further comprises generating a log file, said log file indicating that said at least one external resource is functioning correctly.

27. The computer program product of claim 19, wherein said specified format comprises an Extensible Markup Language (XML) format.

28. The computer program product of claim 19, wherein said at least one external resource is selected from the group consisting of an external software application connected to said computing system, an external hardware device connected to said computing system, a network connected to said computing system, an external computer file connected to said computing system, and a library comprising software components connected to said computing system.

29. A process for integrating computing infrastructure, comprising integrating computer-readable code into a computing system, wherein said computing system comprises a computer-readable memory device, wherein said computer-readable memory device comprises a software application and said computer-readable code, wherein said software application is independent from said computer readable code, and wherein the code in combination with the computing system is capable of performing a software resource testing method, said method comprising:
   receiving, by said computing system, a first table comprising data identifying at least one external resource required for execution of said software application, said least one external resource independent from said software application and said testing tool suite;
   receiving, by said computing system, data identifying an expected state for said at least one external resource and data identifying an expected state for said at least one external resource, said expected state required for enabling said at least one external resource to perform a function for said execution of said software application, said expected state required for enabling said at least one external resource to perform a function for said execution of said software application;
   receiving, by a computer processor of said computing system, data identifying a first action to be taken if said expected state does not equal an actual state generated during a functionality test for said at least one external resource to be performed by said testing tool suite;
   receiving, by said computing system, data identifying a second action to be taken if said expected state equals said actual state during said functionality test;
   receiving, by said computing system, a second table comprising data identifying an attribute and an associated value for said at least one external resource and a description for said attribute;
   generating a resource listing test file comprising a list including said data identifying said at least one external resource, said data identifying said expected state, said data identifying said first action, said data identifying said second action, said attribute, and said associated value;
   storing said resource listing test file in said memory device, said resource listing test file stored in a specified format;
   retrieving, by said computing system, said resource listing test file from said memory unit;
   connecting said at least one external resource to said computing system;
   enabling, by said computing system, said at least one external resource;
   generating, by said at least one external resource, said actual state for said at least one external resource;
   retrieving, by said computing system, data describing said actual state; and
   comparing, by said comparing tool, said expected state from said resource listing test file to said actual state generated by said at least one external resource.

30. The process of claim 29, wherein said method further comprises:
   determining that said expected state does not equal said actual state; and
   executing said first action.

31. The process of claim 29, wherein said at least one external resource is selected from the group consisting of an external software application connected to said computing system, an external hardware device connected to said computing system, a network connected to said computing system, an external computer file connected to said computing system, and a library comprising software components connected to said computing system.

* * * * *